United States Patent
Goto et al.

(10) Patent No.: US 8,389,642 B2
(45) Date of Patent: Mar. 5, 2013

(54) METHOD OF TREATING POLYMER WITH CARBON-CARBON BOND FRAMEWORK AND PRODUCT OBTAINED BY THE TREATING METHOD

(75) Inventors: Toshiharu Goto, Hitachi (JP); Masaaki Yoshida, Utsunomiya (JP); Ryosuke Kobayashi, Utsunomiya (JP)

(73) Assignees: Hitachi Cable, Ltd., Tokyo (JP); Utsunomiya University, Tochigi (JP)

( * ) Notice: Subject to any disclaimer, the term of this patent is extended or adjusted under 35 U.S.C. 154(b) by 131 days.

(21) Appl. No.: 12/874,530

(22) Filed: Sep. 2, 2010

(65) Prior Publication Data
US 2011/0172371 A1 Jul. 14, 2011

(30) Foreign Application Priority Data
Jan. 8, 2010 (JP) ................. 2010-002962

(51) Int. Cl.
*C08F 8/06* (2006.01)

(52) U.S. Cl. ................... 525/333.7; 525/386

(58) Field of Classification Search ............... 525/333.7, 525/386
See application file for complete search history.

(56) References Cited

U.S. PATENT DOCUMENTS

| 3,322,711 A | * | 5/1967 | Bush et al. ................... 524/586 |
| 4,889,897 A | * | 12/1989 | Schuster et al. ............. 525/388 |
| 2002/0103301 A1 | | 8/2002 | Yoshida |
| 2008/0045617 A1 | | 2/2008 | Goto et al. |

FOREIGN PATENT DOCUMENTS

| JP | 2002-212334 | 7/2002 |
| JP | 2008-38006 | 2/2008 |
| JP | 2009-191174 | 8/2009 |

* cited by examiner

*Primary Examiner* — Robert D. Harlan
(74) *Attorney, Agent, or Firm* — Scully, Scott, Murphy & Presser, P.C.

(57) ABSTRACT

A method of treating a polymer includes oxidatively treating the polymer including a carbon-carbon bond framework in a gas atmosphere at a pressure of not less than 5.0 MPa and at a temperature of higher than 140° C. and lower than 200° C. by using oxygen included in the gas atmosphere.

17 Claims, 1 Drawing Sheet

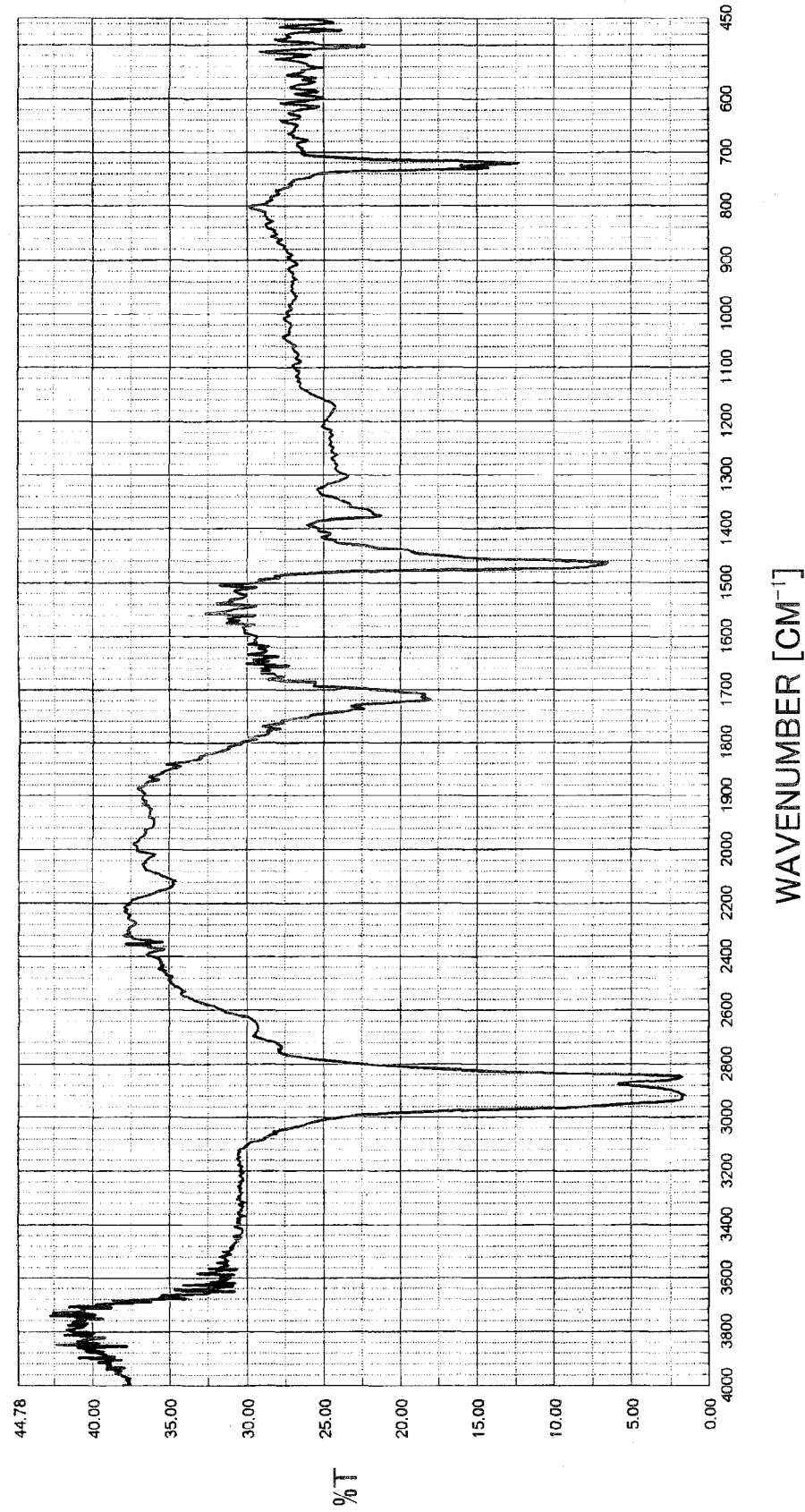

METHOD OF TREATING POLYMER WITH CARBON-CARBON BOND FRAMEWORK AND PRODUCT OBTAINED BY THE TREATING METHOD

The present application is based on Japanese Patent Application No. 2010-002962 filed on Jan. 8, 2010, the entire contents of which are incorporated herein by reference.

BACKGROUND OF THE INVENTION

1. Field of the Invention

This invention relates to a method of treating a polymer with a carbon-carbon bond framework such that a hydrocarbon compound as a polymer with carbon-carbon single bond can be enhanced in functionality by oxidation, and to a product obtained by the treating method.

2. Description of the Related Art

In order to enhance the quality of a fuel such as gasoline and kerosene, it is necessary to accurately control its molecular weight or branch structure, etc. However, since a main component thereof is a hydrocarbon compound mainly formed of a carbon-carbon single bond, it is difficult to break or oxidize only a specific portion of the bond to enhance the functionality.

Also, in case of a polymer with a higher molecular weight than the fuel, its properties are strongly affected by the molecular weight or the structure, it is very important to control the molecular structure thereof. However, it is very difficult to control the oxidation reaction despite that it is possible to impart functions such as adhesiveness or wettability if a polar group or a reactive functional group can be introduced into its polymer backbone by oxidizing under the controlled conditions.

The above-mentioned problem occurs because portions having very similar bond energy or electron state are difficult to react selectively.

On the other hand, Grignard reaction may be used in polar groups introduction to an organic substance under the controlled conditions. However, as the Grignard reaction uses halogen or an organometallic compound, another method is desired in these days where the environmental issues are important.

In order to meet such a desire, a method has been proposed which uses the oxidative decomposition reaction of a waste polymer with nitrogen dioxide in supercritical carbon dioxide, as described in JP-A-2002-212334, JP-A-2008-38006 and JP-A-2009-191174. This method takes advantage of the fact that supercritical carbon dioxide can suppress the reactivity of nitrogen dioxide or hydrogen peroxide as a strong oxidizer.

SUMMARY OF THE INVENTION

However, this method uses expensive and corrosive nitrogen oxides with poor availability, so that it is difficult for the method to industrialize.

In addition, there is the problem that the color of the obtained products changes into yellow when nitrogen dioxide is used.

In case of using hydrogen peroxide, there is the problem that it is difficult for the method to economically industrialize because the method needs to initially absorb nitrogen dioxide and then oxidize with hydrogen peroxide. Thus, the method needs to use nitrogen dioxide with poor availability, totally three hours or more reaction time, and to carry out essentially two steps.

Therefore, it is an object of the invention to provide a method of treating a polymer with a carbon-carbon bond framework such that the polymer can be treated at low cost and by using a readily available substance to preferentially break branches of the carbon-carbon bond of the polymer, and to provide a product obtained by the treating method.

(1) According to one embodiment of the invention, a method of treating a polymer comprises:

oxidatively treating the polymer comprising a carbon-carbon bond framework in a gas atmosphere at a pressure of not less than 5.0 MPa and at a temperature of higher than 140° C. and lower than 200° C. by using oxygen included in the gas atmosphere.

(2) According to another embodiment of the invention, a method of treating a polymer comprises:

oxidatively treating the polymer comprising a carbon-carbon bond framework in a gas atmosphere at a pressure of not less than 5.0 MPa and at a temperature of not higher than 140° C. by using oxygen included in the gas atmosphere, wherein the gas atmosphere comprises a decomposition accelerator.

In the above embodiment (1) and (2), the following modifications and changes can be made.

(i) The polymer is oxidatively treated at an oxygen concentration in the gas atmosphere of not less than 10 g/L.

(ii) A branch point of a carbon-carbon bond of the polymer is preferentially oxidized to break the carbon-carbon bond.

(iii) A tertiary carbon and a quaternary carbon of the polymer are preferentially oxidized.

(iv) The polymer comprises a cross-linked polymer.

(v) The cross-linked polymer comprises a polymer cross-linked by peroxide cross-linking, electron beam cross-linking or silane-water cross-linking.

(vi) The polymer is oxidatively treated for not more than 3 hours.

(vii) A product produced by the method according to the above embodiment (1) or (2) comprising a hydrocarbon; and a carboxyl group in a portion of the hydrocarbon.

Points of the Invention

According to one embodiment of the invention, a polymer with a carbon-carbon bond framework is oxidatively treated (or oxidized) at a temperature of higher than 140° C. and lower than 200° C. and at a pressure of not less than 5.0 MPa. The oxidation reaction does not proceed when the temperature is not more than 140° C. When the temperature is not less than 200° C., the decomposition reaction randomly occurs regardless of the main chain or side chain due to excessive reaction and it is not possible to preferentially oxidize a branch of the carbon-carbon bond or a tertiary carbon. The oxidation reaction is slow when the pressure is less than 5.0 MPa.

BRIEF DESCRIPTION OF THE DRAWINGS

Next, the present invention will be explained in more detail in conjunction with appended drawings, wherein FIG. 1 is a graph showing a FTIR spectrum of a product obtained in Example 1 of the present invention.

DETAILED DESCRIPTION OF THE PREFERRED EMBODIMENTS

A preferred embodiment of the invention will be described in detail below.

In the invention, a polymer with a carbon-carbon bond framework is housed in a reaction container, oxygen is reacted with the polymer with carbon-carbon bond frameworks while maintaining predetermined temperature-pressure conditions and the carbon-carbon bond is broken by preferentially oxidizing a branch of the carbon-carbon bond for producing a treated product from the polymer with carbon-carbon bond frameworks using a low-cost and readily available substance in which discoloration, foaming and gelatinization do not occur under formation conditions and the reaction container is less likely to corrode, and material recycle can be realized by thermally plasticizing a waste polymer such as, e.g., a cross-linked polymer.

In other words, in the invention, the polymer with carbon-carbon bond frameworks is put into the reaction container, and then, oxygen is permeated through and reacted with the polymer with carbon-carbon bond frameworks by adjusting oxygen-containing gas in the reaction container to predetermined temperature-pressure conditions.

For the reaction, it is preferable to use inert gas in addition to oxygen. As the inert gas, there are carbon dioxide and nitrogen. Specifically, carbon dioxide is predictably effective when the reaction temperature is optimized according to the process since control of radical reaction by a radical cage effect can be expected.

Firstly, the polymer with carbon-carbon bond frameworks is put into a reaction container (pressurized vessel), a certain amount of oxygen and liquid carbon dioxide are added thereto, the reaction container is sealed and heated to predetermined temperature-pressure conditions for reaction, and then, a product is taken out after discharging the gas in the reaction container. At this time, the pressure can be controlled by the amount of the initially added oxygen and carbon dioxide.

The conditions at this time are required to be a temperature of higher than 140° C. and lower than 200° C. and a pressure of 5.0 MPa or more. The oxidation reaction does not proceed when the temperature is 140° C. or less. Meanwhile, when the temperature is 200° C. or more, the decomposition reaction randomly occurs regardless of main chain or side chain due to excessive reaction and it is not possible to preferentially oxidize a branch of the carbon-carbon bond or tertiary carbon.

In this regard, however, it is possible to perform the oxidation reaction by adding a below-described decomposition accelerator even when the temperature is 140° C. or less. In this case, since the oxidation reaction is slow unless the temperature exceeds 100° C. even if the decomposition accelerator is used, the temperature is preferably more than 100° C.

In addition, the oxidation reaction is slow when the pressure is lower than 5 MPa. The pressure is preferably 40 MPa or less from the viewpoint of practicability such as a design of device.

The reaction rate of oxygen is faster than hydrogen peroxide or nitrogen dioxide. Thus, the reaction time is preferably not less than 10 minutes and not more than 3 hours. The reason why the reaction rate of oxygen is faster than that of hydrogen peroxide or nitrogen dioxide is considered that oxygen has low polarity and is likely to permeate into a hydrocarbon compound or a cross-linked polymer with low polarity.

On the other hand, before the reaction step of the invention, the carbon-carbon bond may be broken by reacting oxygen with the polymer to preferentially oxidize the branch of the carbon-carbon bond (especially, a bridge structure portion, if any) while maintaining oxygen and carbon oxide to the predetermined temperature-pressure conditions of the invention after performing a step in which the polymer with carbon-carbon bond frameworks is put into a reaction container and a decomposition accelerator and carbon dioxide are added to the reaction container for absorption of the decomposition accelerator to the polymer while maintaining the pressure in the reaction container below supercritical pressure of carbon dioxide. The absorption at this time means that the decomposition accelerator is dissolved into or impregnated with and held by the polymer.

The polymer with carbon-carbon bond frameworks of the invention is a substance having a continuous carbon-carbon bond in at least a portion of the chemical structure thereof, and includes particularly polyolefin or ethylene copolymer with a chemical structure in which the branch of the carbon-carbon bond is cross-linked by peroxide cross-linking, electron beam cross-linking or silane-water cross-linking, or, natural polymers having three dimensional cross-linking structure such as bitumen or asphalt.

The polymer with the continuous carbon-carbon bond is a polymer typified by polyethylene, and the branch of the carbon-carbon bond is, e.g., a branch of the side chain and the main chain of polyethylene or a cross-linked portion.

In general, preferential oxidative cleavage from the bond of tertiary or quaternary carbon is difficult only by a difference in a substitution degree of one carbon of the carbon-carbon bond of hydrocarbon (i.e., primary, secondary tertiary and quaternary carbons).

It is very difficult to control an oxidation degree particularly in the oxidation reaction by oxygen, and in addition, it is accompanied by discoloration at the time of oxidizing as known in general oxidation reaction by oxygen in the air, further leading to burning due to a slight difference in the conditions.

However, in the invention, it is possible to precisely adjust the reactivity of oxygen radical by dispersing the oxygen radical preferably into carbon dioxide gas which is included as an example of the inert gas under the suitable temperature-pressure conditions and, as a result, it is possible to break the carbon-carbon bond by preferentially reacting from the bond of the tertiary or quaternary carbon.

This is realized by finding and taking advantages of the fact that the tertiary carbon radical is slightly more stable than the primary or secondary carbon radical and the reactivity for using the difference of bond energy can be controlled by preferably carbon dioxide which is one example of the inert gas.

Such reaction is considered to be available to thermally plasticize particularly the cross-linked polymer which is cross-linked by peroxide cross-linking or electron beam cross-linking, and has the carbon-carbon bond in the cross-linking structure.

In the cross-linked polymer, tension or strain is generated in the cross-linked portion as a result of molecular motion caused by heat and the carbon-carbon bond of the cross-linking bond is likely to be cleaved from the branched carbon-carbon bond by the radical and, as a result, the cross-linked portion is preferentially broken and it is thereby possible to degrade polymer main chain, i.e., to obtain a treated product of the polymer with carbon-carbon bond frameworks with the minimum deterioration, which allows to recycle the treated product as a recycled polymer.

In addition, since the branch of the carbon-carbon bond is produced in the invention even when, e.g., alkoxysilane is grafted to the polymer using vinylsilane and, subsequently, cross-linking is performed by condensation reaction of silanol group in the presence of moisture, the invention can be effectively used.

From the above-mentioned reason, it is possible to preferentially break the cross-link even when, e.g., the polymer cross-linked by vinylsilane and peroxide cross-linking are mixed each other.

When the inert gas is used, increasing particularly the pressure of carbon dioxide allows to change the concentration of carbon dioxide present around radical molecular and it is thereby possible to arbitrarily control the reactivity of the radical.

In addition, carbon dioxide has low critical points, which are a critical pressure of 7.38 MPa and a critical temperature of 31.1° C., and is available as a supercritical fluid even under the low temperature conditions in which the chemical reaction due to the radical can be suppressed (the conditions of the invention), hence, it is effective to perform selective decomposition reaction using oxygen having high reactivity.

The decomposition accelerator for enhancing the decomposition by oxygen includes aldehyde and alcohol.

Meanwhile, it is preferable to use inert gas in addition to oxygen in the invention, and the inert gas includes carbon dioxide and nitrogen, etc.

Here, the polymer with the continuous carbon-carbon bond includes, e.g., polyolefin such as polyethylene and polypropylene, or chlorinated polyethylene and ethylene copolymer such as ethylene-vinyl acetate copolymer, ethylene-ethyl acrylate copolymer, ethylene-propylene rubber and ethylene-octene rubber.

Here, aldehyde and alcohol as the decomposition accelerator include, e.g., butylaldehyde, isobutyraldehyde, acetaldehyde, pivalaldehyde, benzaldehyde, formaldehyde, methanol, 2-propanol and 1-phenylethanol, etc.

Aldehyde and alcohol generate the radical by reaction with oxygen and proceed the reaction, thus, the reaction temperature can be expected to be lowered to an optimum level and, as a result, there is a possibility that energy required for the treating can be reduced.

In addition, the oxygen concentration in the reaction container is preferably 10 g/L or more. The reaction could slow down at less than 10 g/L. 40 g/L or more is preferable.

Meanwhile, the oxygen concentration, when the decomposition accelerator is added, is preferably 4 g/L or more. The reaction could slow down at less than 4 g/L.

The product obtained by the method of treating a polymer with carbon-carbon bond frameworks of the invention has a carboxyl group in a portion of hydrocarbon. This is because the oxidation of hydrocarbon proceeds to the formation of the carboxyl group. Since such a product having a carboxyl group has adhesiveness, it is possible to reuse as a high performance material such as adhesive polymer.

EXAMPLES

Examples and Comparative Examples of the invention will be described below.

Example 1

0.50 g portion of plate-like peroxide crosslinked PE sample with a gel fraction of 85% (2 mm×5 mm×1 mm) was made from the peroxide crosslinked polyethylene. After the pellet was set in a 50 ml stainless steel autoclave (reaction container), the air in the autoclave was replaced by carbon dioxide, and then, oxygen and carbon dioxide gas were added and reacted with the peroxide crosslinked polyethylene at the reaction temperature, pressure and time shown in Table 1. The reaction container was cooled down after the reaction, the polymer was collected, and the gel fraction as an index of molecular weight distribution and cross-linking degree was measured.

The measurement conditions therefor are as follows.

The molecular weight distribution was measured by a high-temperature GPC (Gel Permeation Chromatograph) using o-dichlorobenzene as a solvent. The result is judged as good ("○") when 300,000 or more of high-molecular-weight component remains even after the number average molecular weight of the collected product decreases, and as bad ("X") when the high-molecular-weight component does not remain. Meanwhile, the sample in which 30% or more of gel remains is indicated by hyphen ("-") since it is not dissolved into o-dichlorobenzene and is not measurable.

The sample after the reaction was immersed in xylene at 110° C. for 24 hours and the remaining sample was dried in a vacuum, and the gel fraction was derived from a ratio to the initial weight, complying with JIS C3005.

The gel fraction is judged as good ("○") for 30% or less, pass ("Δ") for not less than 30% and not more than 35%, and bad ("X") for 35% or more. The discoloration is judged as not discoloring ("○") and discoloring ("X").

FIG. 1 shows a FTIR spectrum of the product obtained in Example 1 by a Fourier transform infrared spectrograph.

Example 2

Example 2 is an example in which an added amount of carbon dioxide in Example 1 is increased to adjust the pressure to 10 MPa.

Example 3

Example 3 is an example in which the temperature in Example 2 is increased to 170° C. to shorten the reaction time.

Examples 4 and 5

Examples 4 and 5 are examples in which the reaction in Example 1 is performed without using carbon dioxide.

Example 6

Example 6 is an example in which nitrogen, i.e., compressed air is used as inert gas in Example 3 instead of using carbon dioxide.

Comparative Example 1

Comparative Example 1 is an example when the temperature in Example 2 is lowered to 140° C.

Comparative Example 2

Comparative Example 2 is an example when the temperature in Example 3 is lowered to 140° C.

Comparative Example 3

Comparative Example 3 is an example when the temperature is increased to 200° C.

Comparative Example 4

Comparative Example 4 is an example when carbon dioxide is not used in Example 1. At this time, an amount of oxygen which was filled in a high-pressure container until reaching the pressure of 4 MPa was 3.0 g.

Comparative Example 5

Comparative Example 5 is an example in which nitrogen, i.e., compressed air is used in Example 1 instead of using carbon dioxide, and at this time, the pressure was 10 MPa and the temperature was 170° C.

Table 1 shows the test results of the above-mentioned Examples 1-6 and Comparative Examples 1-5.

cross-link while maintaining the high molecular weight. In addition, it was possible to decrease the gel fraction to 30% or less with the reaction time of 1 hour by using only oxygen and carbon dioxide without requiring a substance with poor availability such as $NO_2$.

In addition, a C—H absorption band was observed at 2800-2900 $cm^{-1}$ in the FTIR spectrum of the product of FIG. 1, and also an absorption peak was observed at 1705 $cm^{-1}$ which is

TABLE 1

| | | | Decomposition conditions | | | | | Additive | Characteristics of product | | | |
|---|---|---|---|---|---|---|---|---|---|---|---|---|
| | | | | Reaction conditions | | | | | | | | |
| | | Items | Oxidizer | Added amount (g) | Temp. (° C.) | Pressure (MPa) | Time (min) | Added amount (g) | Molecular weight | Gel fraction (%) | Discoloration | Others |
| Examples | 1 | Peroxide crosslinked polyethylene (Gel fraction: 85%, Base: Low-density polyethylene) | $O_2$ | 2.8 | 160 | 7 | 60 | — | ○ | ○ 27 | ○ | |
| | 2 | Peroxide crosslinked polyethylene (Gel fraction: 85%, Base: Low-density polyethylene) | $O_2$ | 2.6 | 160 | 10 | 60 | — | ○ | ○ 5 | ○ | |
| | 3 | Peroxide crosslinked polyethylene (Gel fraction: 85%, Base: Low-density polyethylene) | $O_2$ | 2.2 | 170 | 10 | 30 | — | ○ | ○ 25 | ○ | |
| | 4 | Peroxide crosslinked polyethylene (Gel fraction: 85%, Base: Low-density polyethylene) | $O_2$ | 4.5 | 160 | 6 | 60 | — | ○ | ○ 2 | ○ | Without $CO_2$ |
| | 5 | Peroxide crosslinked polyethylene (Gel fraction: 85%, Base: Low-density polyethylene) | $O_2$ | 6 | 160 | 7 | 60 | — | ○ | ○ 2 | ○ | Without $CO_2$ |
| | 6 | Peroxide crosslinked polyethylene (Gel fraction: 85%, Base: Low-density polyethylene) | $O_2$ | 2.2 | 170 | 18 | 60 | — | ○ | ○ 6 | ○ | $N_2$ is used instead of $CO_2$ |
| Comparative Examples | 1 | Peroxide crosslinked polyethylene (Gel fraction: 85%, Base: Low-density polyethylene) | $O_2$ | 2.8 | 140 | 10 | 60 | — | — | X 70 | ○ | |
| | 2 | Peroxide crosslinked polyethylene (Gel fraction: 85%, Base: Low-density polyethylene) | $O_2$ | 2.8 | 140 | 10 | 30 | — | — | X 75 | ○ | |
| | 3 | Peroxide crosslinked polyethylene (Gel fraction: 85%, Base: Low-density polyethylene) | $O_2$ | 0.51 | 200 | 10 | 30 | — | X | ○ 0 | X | |
| | 4 | Peroxide crosslinked polyethylene (Gel fraction: 85%, Base: Low-density polyethylene) | $O_2$ | 3.0 | 160 | 4 | 60 | — | — | X 72 | ○ | Without $CO_2$ |
| | 5 | Peroxide crosslinked polyethylene (Gel fraction: 85%, Base: Low-density polyethylene) | $O_2$ | 1.2 | 170 | 10 | 60 | — | — | X 60 | ○ | $N_2$ is used instead of $CO_2$ |

Example 1 is the cross-linked polymer of which cross-link is broken and denatured by using oxygen (2.8 g/50 ml, 56 g/L) and it was found from Table 1 that it is possible to break the an absorption band of the carboxyl group, hence, it is understood that the carboxyl group is produced at the same time that the cross-link is broken.

The obtained product is expected to improve painting and adhesion performance of polyolefin, i.e., to be available as adhesive polymer by being blended with polyolefin.

In contrast to Example 1, the temperature conditions of Comparative Examples 1 and 2 were 140° C. and it was not possible to break the cross-link.

In Example 2, it was found that it is possible to completely break the cross-link if the gel fraction is further decreased by increasing the pressure (10 MPa).

On the other hand, the pressure of 4 MPa in Comparative Example 4 is low, and it was not possible to break the cross-link.

Then, in Example 3, it was possible to decrease the gel fraction to 30% or less in a shorter period of time as a result of increasing the temperature to 170° C. On the other hand, it was found that Comparative Examples 3 has a problem that the molecular weight decreases since the temperature is increased to 200° C. Also, the color of the product changed into yellow.

It is possible to react only by oxygen, as are Examples 4 and 5. In addition, it is possible to use the compressed air, as is Example 6.

Meanwhile, Comparative Example 4 is an example in which only oxygen (3 g/50 ml, 60 g/L) is used in Example 1 without using carbon dioxide, and it was found that the reaction does not proceed enough at the low pressure of 4 MPa.

Although it is not described in Examples, it is easily presumed from the results of Example 6 and Comparative Example 4 that the gel fraction of less than 35%, which is within a range that no problem practically occurs, is achieved at the pressure of 5 MPa.

Meanwhile, Comparative Example 5 is an example in which the compressed air is used in the same manner as Example 6 with 1.2 g/50 ml (24 g/L) of oxygen at the pressure of 10 MPa, and it was found that the reaction does not proceed enough due to the low oxygen concentration.

From the above, it was found that the pressure of atmosphere gas in the reaction container should be 5.0 MPa or more and the temperature should be higher than 140° C. and lower than 200° C.

Examples 7-12 and Comparative Example 6 in which the decomposition accelerator is added will be described below.

Example 7

Example 7 is an example in which the reaction in Example 1 is performed by decreasing the energy required for the treating under the lower temperature conditions and by adding butylaldehyde as the decomposition accelerator instead of reducing the required amount of oxygen.

Example 8

Example 8 is an example in which benzaldehyde is added instead of butylaldehyde and the oxidation is performed at 140° C. in Example 7.

Example 9

Example 9 is an example of treating by reaction under the lower temperature conditions (100° C.).

Example 10

Example 10 is an example in which acetaldehyde is added in Example 7 instead of butylaldehyde.

Example 11

Example 11 is an example in which silane cross-linked polyethylene is used in Example 7 instead of peroxide cross-linked polyethylene.

Example 12

Example 12 is an example in which nitrogen, i.e., compressed air is used in Example 7 instead of using carbon dioxide.

Comparative Example 6

Comparative Example 6 is an example when formic acid is used as an additive in Example 7 instead of using butylaldehyde.

Table 2 shows the test results of Examples 7-12 and Comparative Example 6.

TABLE 2

| | | | Decomposition conditions | | | | | Characteristics of product | | | |
| | | | Reaction conditions | | | | | | | | |
| | Items | | Oxidizer | Added amount (g) | Temp. (° C.) | Pressure (MPa) | Time (min) | Additive Added amount (g) | Molecular weight | Gel fraction (%) | Discoloration | Others |
|---|---|---|---|---|---|---|---|---|---|---|---|---|
| Examples | 7 | Peroxide crosslinked polyethylene (Gel fraction: 85%, Base: Low-density polyethylene) | $O_2$ | 0.2 | 120 | 10 | 60 | Butylaldehyde 0.3 g | ○ | ○ 8 | ○ | |
| | 8 | Peroxide crosslinked polyethylene (Gel fraction: 85%, Base: Low-density polyethylene) | $O_2$ | 0.2 | 140 | 13 | 60 | Benzaldehyde 0.3 g | ○ | ○ 27 | ○ | |
| | 9 | Peroxide crosslinked polyethylene (Gel fraction: 85%, Base: Low-density polyethylene) | $O_2$ | 0.2 | 100 | 9 | 60 | Butylaldehyde 0.3 g | ○ | Δ 31 | ○ | |
| | 10 | Peroxide crosslinked polyethylene (Gel fraction: 85%, Base: | $O_2$ | 0.2 | 140 | 10 | 60 | Acetaldehyde 0.2 g | ○ | ○ 29 | ○ | |

TABLE 2-continued

| | Items | Decomposition conditions — Reaction conditions — Oxidizer | Added amount (g) | Temp. (°C.) | Pressure (MPa) | Time (min) | Additive Added amount (g) | Characteristics of product — Molecular weight | Gel fraction (%) | Discoloration | Others |
|---|---|---|---|---|---|---|---|---|---|---|---|
| | | | | | | | | | | | |
| | Low-density polyethylene) | | | | | | | | | | |
| | 11 Silane cross-linked polyethylene (Gel fraction: 70%, Base: Low-density polyethylene) | $O_2$ | 0.2 | 120 | 9 | 60 | Butylaldehyde 0.2 g | ○ | ○ 6 | ○ | |
| | 12 Peroxide crosslinked polyethylene (Gel fraction: 85%, Base: Low-density polyethylene) | $O_2$ | 0.2 | 120 | 8 | 60 | Butylaldehyde 0.2 g | ○ | ○ 22 | ○ | $N_2$ is used instead of $CO_2$ |
| Comparative Example | 6 Peroxide crosslinked polyethylene (Gel fraction: 85%, Base: Low-density polyethylene) | $O_2$ | 0.2 | 120 | 10 | 60 | Formic acid 0.3 g | — | X 70 | ○ | |

It was found from Table 2 that, in Examples 7-12, it is possible to perform the decomposition reaction by adding aldehyde decomposition accelerator as an additive even at a low oxygen concentration of 0.2 g/50 ml (4 g/L). It was also found that the pressure should be 5.0 MPa or more. In addition, it was found that silane cross-linked polyethylene can be used other than peroxide cross-linked polyethylene as is Example 11.

On the other hand, although acid (formic acid) was added in Comparative Example 6 instead of aldehyde, it was not possible to confirm the effect of reducing the reaction temperature.

From the comparison of these results with Comparative Example 1 in which the decomposition accelerator is not used, it was found that the decomposition accelerator is effective.

This is because aldehyde as the decomposition accelerator is likely to produce the radical by reacting with oxygen.

Meanwhile, although it is not shown in the table, the decomposition reaction did not proceed enough in an attempt to decompose the cross-link by adding aldehyde at a low oxygen concentration (0.1 g/50 ml, 2 g/L), however, it is possible to proceed the reaction at the oxygen concentration of 0.2 g/50 ml (4 g/L) or more and it is thus preferable that the oxygen concentration, when the decomposition accelerator is added, is 4 g/L or more.

From the above, it was found that use of the oxygen reaction by a combination of inert gas such as carbon dioxide with oxygen is effective and is convenient especially for selective decomposition of the cross-link.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A method of treating a polymer, comprising:
   oxidatively treating the polymer comprising a carbon-carbon bond framework in a gas atmosphere at a pressure of not less than 5.0 MPa and at a temperature of higher than 140° C. and lower than 200° C. by using oxygen included in the gas atmosphere.

2. The method according to claim 1, wherein the polymer is oxidatively treated at an oxygen concentration in the gas atmosphere of not less than 10 g/L.

3. A method of treating a polymer, comprising:
   oxidatively treating the polymer comprising a carbon-carbon bond framework in a gas atmosphere at a pressure of not less than 5.0 MPa and at a temperature of not higher than 140° C. by using oxygen included in the gas atmosphere,
   wherein the gas atmosphere comprises a decomposition accelerator.

4. The method according to claim 1, wherein a carbon positioned at a branch point of a continuous carbon-carbon bond of the polymer is oxidized preferentially to a carbon other than the branch point carbon to break the carbon-carbon bond between the branch point carbon and a carbon positioned at a side of the branch.

5. The method according to claim 1, wherein a tertiary carbon and a quaternary carbon of the polymer are oxidized preferentially to a carbon other than the tertiary carbon and the quaternary carbon.

6. The method according to claim 1, wherein the polymer comprises a cross-linked polymer.

7. The method according to claim 6, wherein the cross-linked polymer comprises a polymer cross-linked by peroxide cross-linking, electron beam cross-linking or silane-water cross-linking.

8. The method according to claim 1, wherein the polymer is oxidatively treated for not more than 3 hours.

9. A product produced by the method according to claim 1, comprising:
   a hydrocarbon; and a carboxyl group in a portion of the hydrocarbon.

10. The method according to claim 3, wherein a carbon positioned at a branch point of a continuous carbon-carbon bond of the polymer is oxidized preferentially to a carbon other than the branch point carbon to break the carbon-carbon bond between the branch point carbon and a carbon positioned at a side of the branch.

11. The method according to claim 3, wherein a tertiary carbon and a quaternary carbon of the polymer are oxidized preferentially to a carbon other than the tertiary carbon and the quaternary carbon.

12. The method according to claim 3, wherein the polymer comprises a cross-linked polymer.

13. The method according to claim 12 wherein the cross-linked polymer comprises a polymer cross-linked by peroxide cross-linking, electron beam cross-linking or silane-water cross-linking.

14. The method according to claim 3, wherein the polymer is oxidatively treated for not more than 3 hours.

15. A product produced by the method according to claim 3, comprising:

a hydrocarbon; and a carboxyl group in a portion of the hydrocarbon.

16. The method according to claim 1, wherein the gas atmosphere further comprises carbon dioxide.

17. The method according to claim 3, wherein the gas atmosphere further comprises carbon dioxide.

* * * * *